United States Patent Office 3,636,017
Patented Jan. 18, 1972

3,636,017
PRODUCING LACTYLIC ACID ESTERS OF FATTY ACIDS
Stanley Eng, Mentor, Ohio, assignor to Glyco Chemicals, Inc., New York, N.Y.
No Drawing. Continuation-in-part of application Ser. No. 526,684, Feb. 11, 1966. This application Nov. 20, 1969, Ser. No. 878,540
Int. Cl. C07c 69/68; C11c 3/00; A21d 2/16
U.S. Cl. 260—410.9 R
12 Claims

ABSTRACT OF THE DISCLOSURE

Production of fatty acid esters of lactic acid by (a) reacting lactic acid with an at least partly water-soluble alkali metal alkaline earth metal or ammonium base to form the corresponding lactic acid salt, (b) esterifying said salt with a fatty acid and (c) treating the resulting salt of the acyl lactic acid with mineral acid to convert it to the fatty acid ester of lactic acid. The products are useful as additives for bakery products.

---

This application is a continuation-in-part of co-pending application Ser. No. 526,684, filed Feb. 11, 1966, now abandoned.

This invention is that of an improved process for preparing improved products composed predominately of at least one fatty acid ester of lactic acid, otherwise called an acyl lactic acid, which fatty acid or acyl radical thereof has from 14 to 24 carbons, and advantageously from 16 to 22 carbons. These improved products are effective as additives to baking constituents to provide improved qualities in the resulting baked comestibles.

More specifically the process of the invention involves producing these improved preparations composed predominately of at least one fatty acid ester of lactic acid by (a) reacting lactic acid with from about three-quarters of (a) to about an equal, molar equivalent of an at least partly soluble in water basicly-acting compound having a cation to provide the corresponding lactate, namely, the lactic acid salt or lactate of that cation; (b) esterifying that lactic acid salt with the selected said fatty acid or mixture of fatty acids, (c) treating the resulting salt of the acyl fatty acid with sufficient of a suitable mineral acid of suitable concentration to convert said salt to the desired acyl lactic acid product, which (d) then is separated and with only a significantly low content of corresponding combined acyl polylactic acid fractions (as further discussed) and an amount of free fatty acid, which does not diminish the effectiveness of the improved products as additives to baking constituents.

U.S. Pat. 2,789,992, issued in April 1957 describes producing fatty acid esters (and salts of said esters) of lactylic acids (as therein defined), therein called acyl lactylic acids and having the formula

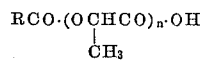

wherein RCO is the acyl radical of a fatty acid or mixture of fatty acids having from 16 to 24 carbon atoms, and $n$ is from 1 to about 8.5 (and represents the average degree of polymerization of the lactyl radical in the starting lactylic acid), by reacting the corresponding fatty acid halides (e.g. RCO·Cl) with the starting lactylic acid (which embraces the monomeric lactic acid as well as the polymeric lactic, i.e. polylactic, acids in the commercial product), at a reaction initiating temperature of 50° to about 75°, followed by extended heating at further elevated temperature varying from 80° to 180° to complete the reaction with the cessation of HCl evolution. All of these temperatures and all others below and in the accompanying claims are in degrees centigrade.

Patent 2,973,270, issued in February 1961 describes cake mixes containing improved shortenings having admixed in them the same acyl lactylic acids wherein $n$ of the above general formula is from 1 to 6, preferably between 1 and 3, which esters presumably are prepared by the same method as indicated by the reference in the prior Pat. 2,789,992.

A serious disadvantage, among others, in that process of this patent is the much higher production cost of these esters due to their first having to produce the starting fatty acid halides, which involves reacting the corresponding fatty acids themselves with a thionyl halide as thionyl chloride, also not an inexpensive reactant.

The inventors in the foregoing patents describe in their Pat. 2,733,252 a process for making salts of the fatty acid esters of lactylic acid by heating a mixture of the fatty acid or fatty acids whose ester is desired, with the lactylic acid reactant and a more than catalytic amount of an alkali or alkaline earth metal oxide, hydroxide or carbonate.

In the studies ultimately resulting in the present invention, attempts were made to prepare the fatty acid esters of these lactylic acids by treating the calcium salt of the fatty acid ester of lactylic acid, obtained by the just above-noted method of Pat. 2,733,252, with sulfuric acid. However, the resulting (free) fatty acid ester was found to have an undesirably high content of combined acyl polylactic acid fractions to be satisfactory for general use in improving the qualities of the baked products and particularly for admixture into shortenings for cake mixes.

Also in the studies resulting in the present invention, direct esterification of commercial lactic acid with the fatty acid starting material was attempted. However, the end product of that method also showed an undesirably high content of free fatty acid as well as of combined acyl polylactic acid fractions, for it to be satisfactory for the intended uses.

Combined acyl polylactic acid fractions, as variously used herein, is the total content of the fatty acid esters of the lactyl lactic acid and of all of the various polylactic acids contained in the various starting ordinary commercial lactic acids as a result of the conditions to which they are subjected in the various processes wherein they finally are esterified with the fatty acids concerned.

The various foregoing limitations, shortcomings and disadvantages are avoided by the process of this invention.

A further significant feature is that the process avoids such steps which increase the limited content of lactyl lactic acid in the starting ordinary commercial lactic acid.

Thus, still a further feature of the process of the invention is the fact that the fatty acid reactant does not contact the extent of lactyl lactic and polylactic acids that is encountered in earlier methods. That then provides another important feature that the end products are so inordinately low in content of combined acyl polylactic acid fractions.

Yet a further feature of the invention is the particularly low content of free lactic acid possible in the end products of the invention, and the relative ease and economy of its process.

Another striking feature is that the process does not require strictly anhydrous conditions in the esterification procedure.

Considered broadly, the process of the invention involves the combination of steps of:

(a) reacting lactic acid in an aqueous medium at a temperature from ambient to about 80° with from about three-quarters of (a), to about an equal, molar equivalent of a basicly-acting compound which is at least partially soluble in water (with alkaline reaction) and selected from alkali metal, ammonium, alkaline earth metal, and magnesium oxides, hydroxides, carbonates, and bicarbonates, and whose cation forms with lactic acid the corresponding water-dispersible lactate, to form the corresponding salt, i.e. lactate therein;

(b) heating said latcic acid salt, advantageously in said aqueous medium, with at least one said fatty acid having from about 14 to about 24 carbon atoms and in the ratio of from about 1.5 to about 1 mole of said lactic acid salt per mole of fatty acid, at from about 180° to about 220° to eliminate from about the major part to substantially all of the water and esterify the lactic acid salt with the fatty acid and form the corresponding salt of that fatty acid ester of lactic acid;

(c) treating that salt of that fatty acid of lactic acid with an aqueous solution of sulfuric, hydrochloric, or phosphoric acid, at from about 60° to about 90° for sufficient time for that salt of that ester to be substantially converted to the corresponding acyl lactic acid, i.e. the free acid form of that ester, with the amount of the treating acid and its concentration in the reaction mixture being at least sufficient to convert that salt of said ester to that acyl lactic acid and below that which could produce destructive products thereof (distinguished from reaction equilibrium products), under these reaction conditions; and (d) separating said acyl lactic acid from said reaction medium.

Obviously, "below that which would produce destructive products" in the foregoing part (c) means without charring, decomposing or deleteriously affecting any of the products involved.

Any basicly-acting compound, as defined in the just preceding subdivision (a), may be used for the practically suitable salt of lactic acid to be made. Advantageously the basicly-acting agent can be, but is not limited to, one which forms a water-soluble lactate because its cation (metal or radical as ammonium) forms a water-soluble sulfate, chloride, or phosphate respectively with sulfate, chloride, or phosphate ions in an aqueous medium.

The basicly-acting agent used to neutralize the lactic acid to form its water-soluble salt then may be, for example, an alkali metal hydroxide, beneficially potassium hydroxide or advantageously the least costly sodium hydroxide, or also ammonium hydroxide, or an alkaline earth oxide or hydroxide such as calcium hydroxide or magnesium hydroxide (included with the alkaline earths) each of which latter may be used best in the form of a readily flowable slurry.

The alkali metal hydroxide, e.g. potassium, and particularly sodium, hydroxide are best used in the readily commercially available solutions such as 50% NaOH. The basicly-acting compounds also include the alkali metal and ammonium bicarbonates such as sodium, potassium, and ammonium carbonates and bicarbonates.

A distinct advantage of the process is that any of the commercially ordinarily available grades of lactic acid, such as the 80%, 85% or 88–90% products, can be used without any necessary further concentration; although any more concentrated commercially available lactic acid may be used, without any further special treatment such as that described in U.S. Pat. 3,141,030, dated July 14, 1964.

The selected water-soluble lactate, advantageously the sodium lactate, may be prepared simply by mixing the lactic acid with the alkaline aqueous solution of the basicly-acting agent, in substantially stoichiometric proportions, and advantageously adding one to the other at a rate to maintain the solution temperature between about 18 to 80°. After the mixing is complete, the resulting solution beneficially is stirred at elevated temperature within the range just noted for a time sufficient to be certain that the mixing was homogenerous and the neutralization complete.

If it is desired to shorten the time for completing the admixture of the reactants, the mixing vessel may be cooled by suitable means to hold the mixture temperature within the above stated range. Generally, the resulting solution of the lactate, such as the sodium lactate, should show an acid value of about 3 or a neutralization value of about 3.

It is unnecessary to separate the specific lactate salt from the water containing it as a result of its preparation, to react it with the fatty acid or mixture of fatty acids selected for the esterification to form the corresponding salt of the fatty acid lactate, so long as the esterification is carried out advantageously at the above-stated elevated temperature, under conditions to avoid undesirable foaming. Otherwise, it is advantageous to concentrate the aqueous solution of the prepared water-soluble lactic acid salt, to a concentration below that at which excessive foaming can occur, and often beneficial to remove most of the water, that is to say, to leave no more than about 10% or less of it and better still even as little as 5% or less. Progress of the esterification can be followed by sampling to check the acid value. This reaction can be terminated when the acid value reaches 45, and advantageously when it is below 35, as between that and 25.

For the esterification there may be used any fatty acid, or mixture of them, having from 14 to 24 carbon atoms, for example, such as the saturated acids as myristic, margaric, palmitic, stearic, arachidic, and behenic acid or even an unsaturated acid such as oleic. Often it is beneficial to use commonly available mixtures of any of these, particularly the various commercially available grades of stearic acid, which actually are mixtures of different proportions of primarily stearic and palmitic acids, and at times with about 2 to 3 percent of other vegetable or animal source fatty acids primarly myristic acid, as obtained from fats and tallow. These mixtures are identified herein as stearic acid followed by their respective content enclosed in parentheses.

Then the ester salt, for example, the sodium salt of the fatty acid ester of lactic acid, obtained from their esterification with a salt of lactic acid, conveniently may be called the "sodium stearoyl (with palmitoyl) (70/30) lactate" wherein the figures within the parentheses express the respective percentages of stearic and palmitic acids in their original fatty acid mixture.

There also may be used a fatty acid mixture such as the hydrogenated fish oil fatty acids of approximately the following composition:

| | Percent |
|---|---|
| Palmitic acid | 29 |
| Stearic acid | 18 |
| Arachidic acid | 26 |
| Behenic acid | 17 |
| Oleic acid | 2 |
| Myristic acid | 8 |

The aqueous sulfuric or other acid used to acidify the ester salt to liberate the free fatty acid ester or esters of lactic acid, for example, stearoyl lactic acid, from the ester salt or mixture of ester salts, should be of such concentration that after it is diluted by any water accompanying said salt, it is inert to the organic moiety of the free acyl lactic acid product as well as that of the ester salt. Beneficially the aqueous sulfuric acid used for that purpose may contain from about 10 to about 30 percent $H_2SO_4$ by weight or even more, but advantageously about 15% by weight. Corresponding concentrations of either of the hydrochloric or phosphoric acids may be used.

Generally the end product free acyl lactic acid is separated from the reaction mixture advantageously by letting the mixture stand to separate into two layers and drawing or siphoning off the lower (aqueous) layer. It is beneficial then to wash the (remaining) acyl lactic acid layer, for example, by stirring in a weak (e.g. 5 to 10%, specifically 6.5%) aqueous solution of sodium sulfate, followed by settling and drawing off and discarding the wash solution, and repeating with a fresh solution if indicated. Alternatively, a weak sulfuric acid wash say, about 0.05 to 0.1 percent solution, likewise can be used.

The process of the invention yields the predominately acyl lactic acid product, wherein the acyl radical has from 14 to 16 to 24 carbons. The major part of this acyl lactic acid ester product is present as the mono-ester, i.e. the free acyl lactic acid, and associated with said mono-ester less than 35% of free fatty acid (i.e. which was used in its preparation), or beneficially from about 30 to about 25% or less of said free fatty acid, less than 10% of combined acyl polylactic acid fractions (i.e. fatty acid ester of all polylactic or lactyl lactic acid which was in the starting lactic acid as well as that formed in the series of steps), and fairly often under 4% of said fraction and even under 0.5% of it. Generally if any free lactic acid is present, its content is much lower than that of the combined acyl polylactic acid fractions.

The invention is illustrated by, but not limited to, the following examples:

EXAMPLE 1

Stearoyl(with palmitoyl) (70/30) lactic acid (A) Salt-forming: 3.376 kilos of 90.6% lactic acid were added with stirring to 2.662 kilos of 50.5% aqueous sodium hydroxide, i.e. containing 50.5% NaOH, over 37 minutes while keeping the temperature between 18° and 60°. The fluid reaction mass was stirred while maintaining its temperature at 59–60° for additional 45 minutes. The resulting sodium lactate solution showed a neutralization value of 0.05 and calculated sodium lactate concentration of 62.5%.

(B) Esterification: 410 grams of this 62.5% aqueous sodium lactate (2.29 mols) were charged into a 2-liter 3-necked reaction flask (equipped with thermometer, stirrer, and carbon dioxide sparging tube) and concentrated to a boiling temperature of 200° over 50 minutes to but a few percent of residual water, and then cooled to 180°. 590 grams of stearic acid (70% stearic and 30% palmitic) (2.08 mols) were added with stirring over a period of one and one-half hours while holding the temperature at about 178–180°. The stirring was continued with sufficient heating to hold the temperature at about 180°, while a stream of $CO_2$ was bubbled through the reaction liquid, until an acid value of 31 was reached. The finished sodium stearoyl(with palmitoyl)lactate was obtained in 96% yield, and color of about 6 Gardner.

The carbon dioxide stream introduced, for example, through the sparging tube assists in the agitation and in carrying off the water at the elevated reaction temperature.

(C) Acidification: 325 grams of aqueous sulfuric acid (containing 15% $H_2SO_4$) were charged into a 1-liter jacketed reaction flask fitted with agitator and bottom drain, and were heated therein to 70°. 300 grams of sodium stearoyl(with palmitoyl) lactate in small chunks were added while stirring over about one minute. The two phase reaction mixture was stirred for 15 minutes at 70° when the agitation then was stopped to let the two phases separate.

The aqueous (lower) layer then was drawn off. 321 grams of aqueous sodium sulfate solution (containing 6.5% $Na_2SO_4$) heated to 70° were added, and the stirring started and continued for 15 minutes to wash the organic product. The stirring then was stopped to allow the two phases to separate, and the aqueous layer then was drawn off and discarded. The small amount of residual water was distilled off over 30 minutes at 73–88° under 20 millimeters (mm.) of mercury (Hg) pressure.

The end product stearoyl(with palmitoyl) lactic acid, having color of 6 Gardner, was decolorized by adding 0.8 gram of 30% hydrogen peroxide and 0.7 gram of 50% aqueous sodium hypochlorite at 71° and then heating to 90° for a half hour. The product then was filtered The yield was 85% based on starting lactic acid, color 1 Gardner, and composition (determined by gas liquid chromatograph) of 31.5% free fatty acid, 58.7% mono-ester, i.e. acyl lactic acid, and 8.6% combined acyl polylactic acid fractions.

EXAMPLE 2

Stearoyl(with palmitoyl) (90/10) lactic acid (A) Salt-forming: 1121 grams of 88.4% lactic acid were added with stirring to 879 grams of 50.1% aqueous sodium hydroxide over 24 minutes while holding the temperature in the range of 16° to 50°, with external cooling. The liquid reaction mass was stirred for 15 minutes while heating slightly to hold the temperature at 50°. To this product, whose neutralization value was 3.2, were added 15 grams more of the lactic acid to adjust the acid value of the solution to merely a trace. The colorless solution had a calculated sodium lactate concentration of 62.1%.

(B) Esterification: 388 grams of this 62.1% aqueous sodium lactate were concentrated to a boiling temperature of 200° in a reaction flask such as used in part (B) of Example 1, to a residual 2% of water. 612 grams of stearic acid (90% stearic, 10% palmitic) then were added in molten form while stirring over a period of one hour at 200°. The liquid reaction mass then was heated at this temperature with a stream of $CO_2$ bubbling through it and while stirring for 12 hours until its acid value reached 34. After cooling, the yield of the sodium acyl lactate was 97.4% of theory, with color of 13+ Gardner.

(C) Acidification: 250 grams of the sodium stearoyl (with palmitoyl) lactic acid of part (B) in chunks were added with stirring to 294 grams of 15% sulfuric acid at 65° in a 1-liter 3-necked flask fitted with thermometer and agitator, and the stirring continued for 15 minutes at 65–68°. The stirring then was stopped to let the two layers separate, and after 5 minutes the aqueous (lower) phase (288 grams) was siphoned off and discarded.

267 grams of 6.5% aqueous sodium sulfate heated to 63° were added to the ester layer, and their mixture stirred for 15 minutes at 63–69° when the agitation was stopped to let the two phases separate. After about 3 minutes the aqueous layer (263 grams) was siphoned off and discarded. The ester layer then was stirred and heated for 13 minutes at 60–70° with the pressure lowered to 20 mm. Hg maintained for 15 minutes to dehydrate the ester to a water content of 0.1%. Its color was 12 Gardner.

The end product stearoyl (with palmitoyl) lactic acid, with color 12 Gardner was decolorized, by adding 0.25 gram of 30% hydrogen peroxide and 0.25 gram of 50% aqueous sodium hypochlorite, heating to 80° while stirring for 15 minutes, to reach a final color of 6+ Gardner. The product, obtained in 85.1% yield, filtered through #4 Whatman filter paper, contained 22.4% free fatty acid, 60.3% of the mono-ester acyl lactic acid, and 9.5% combined acyl polylactic acid fractions.

EXAMPLE 3

Stearoyl lactic acid (A) Salt-forming: 428 grams of 50% aqueous sodium hydroxide were added with stirring to 572 grams of 88% lactic acid over 16 minutes while maintaining the temperature at 15–58° with external cooling. The reaction liquid then was heated at 75–78° for four hours, giving a resulting solution with a calculated concentration of 59.8% sodium lactate.

(B) Esterification: 402.7 grams of a 61.4% aqueous sodium lactate (2.2 mols) and 597.3 grams of stearic acid (2.1 mols) were charged into a 2-liter 3-necked flask fitted as in Example 1. Their mixture was heated with stirring to 200° over two and three-quarter hours. The heating and stirring was continued under the same conditions for eleven and one-quarter hours until an acid value of 26.6 was reached. After cooling, sodium stearoyl lactate was obtained in 99.7% yield.

(C) Acidification: 353 grams of 15% sulfuric acid were charged into a 1-liter 3-necked flask fitted with a thermometer and agitator, and heated to 60°. 300 grams of the solid sodium stearoyl lactic acid in chunks were added with stirring over 3 minutes while the temperature was held at 60–63°. The stirring was continued for 15 minutes at 63–72° and then stopped to let the two phases separate. The aqueous layer (350 grams) was siphoned off and discarded. 321 grams of 6.5% aqueous sodium sulfate solution were added to the stearoyl lactic acid layer and their mixture was stirred for 10 minutes at 67–73° for 10 minutes, after which the stirring was stopped.

After letting the two phases separate over 3 minutes, the aqueous layer (331 grams) was siphoned off and discarded. The remaining ester layer then was heated while the pressure was lowered over 10 minutes to 20 mm. Hg which was held for 15 minutes at 61–66° to dehydrate the product. The stearoyl lactic acid product, in yield of 92.4%, was composed of 26.6% free fatty acid, 62% stearoyl lactic acid mono-ester (more specifically alpha-stearoyloxypropionic acid, sometimes called marvic acid), and 8.6% combined acyl polylactic acid fractions.

EXAMPLE 4

Stearoyl(with palmitoyl) (87/10) lactic acid (A) Salt-forming: 336 lbs. (3.28 mols) of 88% lactic acid were added as in Example 1 to 224.2 lbs. (2.8 mols) of 50% aqueous sodium hydroxide over about 2 hours while holding the temperature between 55 to 65° with external cooling. After continuing the stirring at that temperature range for one-half hour, the pH was about 5.5.

(B) Esterification: The resulting aqueous sodium lactate solution was heated with stirring to 180° over about 3 hours in a reactor equipped as in Example 1, and 665 lbs. of stearic acid (87% stearic, 10% palmitic, balance primarily myristic) (2.34 mols) were added while stirring during about 4 hours. The reaction mixture was heated while stirring to 200° and continued at that level while sparging with $CO_2$ gas for about 12 hours. At that time the acid value was 26.5.

(C) Acidification: The resulting esterified product was added as liquid to 1,087.5 lbs. (3.73 equivalents) of 16.8% aqueous sulfuric acid at 50 to 60° with the temperature rising to 95° during the addition. The mixture was stirred for 10 minutes and then let settle for 15 minutes, when the lower aqueous layer was drawn off and discarded.

The remaining free acid ester mixture was washed by stirring for 15 minutes with 760 lbs. of 2.6% aqueous sulfuric acid at 95°. After settling for 15 minutes, the aqueous layer was drawn off and discarded. The washed ester was decolorized by heating it for 15 minutes at 85° in the presence of 8 lbs. of admixed 50% aqueous sodium chlorite and 8 lbs. of 33% aqueous hydrogen peroxide. The water was driven off by heating the liquid mixture at 90° under 50 mm. Hg over 30 minutes. After filtration, the molten end product showed color 3+ Gardner and composition of 64.1% mono-ester (i.e. alpha-alkanoyl lactic acid), 24% free fatty acid, 9.7% alkanoyl polyester, 1.6% free and poly lactic acid, and 0.13% moisture.

EXAMPLE 5

Stearoyl(with palmitoyl) (55/43) lactic acid

Example 4 was repeated except for the following changes—

(A) Salt-forming: 500 lbs. (4.88 mols) of the lactic acid were added to 308 lbs. (3.85 mols) of the aqueous sodium hydroxide. The resulting aqueous sodium lactate solution showed pH 5.

(B) Esterification: To the heated sodium lactate solution there were added 959 lbs. of the stearic acid (55% stearic, 43% palmitic, balance primarily myristic) (3.574 mols). The acid value was 25.5 at the completion of the reaction.

(C) Acidification: The obtained fatty acyl sodium salt was added to 1495.7 lbs. (51.3 equivalents) of the aqueous sulfuric acid. The crude free acid ester (i.e. alpha-alkanoyl lactic acid) mixture remaining after discarding the aqueous acid wash solution (containing the by-product sodium sulfate) was washed with 210 lbs. of water. The resulting washed ester was decolorized only with 20 lbs. of 50% aqueous sodium chlorite. The final product after driving off the water and filtration showed color 8+ Gardner, 61.5% mixed alpha-alkanoyl lactic acid, 28% free fatty acid, 9.6% mixed alkanoyl polyester, 2.8% free and poly lactic acid, and 0.17% moisture.

The specific starting lactic acid used in any of the separate examples can be replaced by the same or different molal equivalent ratio (to alkaline reactant within the earlier above disclosed as applicable range) of any of the other strengths of lactic acid of the other examples or commercially available. So also, the sodium hydroxide solution of the examples can be replaced in any of them by any other strength solution, or the molal equivalent of potassium or ammonium hydroxide, or sodium, potassium, or ammonium carbonate or bicarbonate, or stoichiometric equivalent of calcium or magnesium hydroxide or slaked calcium or magnesium oxide, or of any other water-soluble or at least partially water-soluble basically-acting agent of the type specifically named or more broadly defined earlier hereinabove.

Similarly, the specific fatty acid or mixture of fatty acids used in any of the complete examples can be replaced by the stoichiometric equivalent of any other single fatty acid or mixture of them specifically named anywhere herein or included in the broad description given earlier above of the applicable fatty acids.

Likewise, the sulfuric acid solution used in the acidification step in any of the full examples can be replaced by any other applicable concentration of it as further above explained or by the acid equivalent amount or concentration of hydrochloric or phosphoric acid.

Then too, the specific sodium sulfate solution used in washing the end product of Example 3 can be replaced by some other concentration of it that does not adversely affect the end product, or by other indicated concentration of a weak sulfuric acid wash as noted above.

Accordingly, each of the individual complete examples is to be considered as if written out separately in full with each of these different possible changes separately respectively independently made, without writing out in full each of them with each of such single possible changes, to avoid over-extending this specification and making it prolix; and also as well as at different temperatures and times in each of them in each of their separate steps, within the respective temperature and time ranges recited earlier above for these different steps.

The end products of the various examples can be incorporated as additives in flour mixes in the approximate range of, say, from about 0.1 to about 0.5% by weight of the flour for bread making, and possibly to the extent of about three times those percentages by weight in shortenings for cake products.

As thus used as additives for these baked products, these products serve to enhance their overall quality. For example, they have been reported to enhance the flavor of baked comestible products.

Then also, incorporation of as little as 0.1% of a product of this invention by weight into bread flour was reported to give finished bread loaves which surpassed in bread volume, texture, and indicated retention of softness during aging identical bread loaves both made and tested at the same time and baked and tested under identical conditions, but containing instead admixed in their flour 0.1% of a commercially sold additive which is the calcium acyl lactylic acid corresponding product made by a process corresponding to that of U.S. Pat. 2,733,252. Both sets of loaves were rated "very good" in break and shred, appearance, crust color, grain, crumb color, and flavor tests.

Any cation or anion of any of the reagents used in any of the steps of the process generally are not carried through to remain in any significant concentration in the end product. However, as to any whose presence would be undesirable in the end product, there is no problem because adequate suitable washing can be carried out after the end product is separated, or at any earlier suitable point in the process.

The alpha - stearoyl(with palmitoyl) - propionic acid mono-ester containing products of this invention prepared from stearic acid (80–90% stearic, 20–10% palmitic, with or without about 2 to 3% of primarily myristic with other fatty acids in the disclosed range) melt at 50° to 55°, whereas those from stearic acid (about 45% stearic, 55% palmitic) melt at 44° to 46°.

While the invention has been explained by detailed descriptions of certain specific embodiments of it, it is understood that various changes or substitutions may be made in any of them within the scope of the appended claims which are intended also to cover equivalents of the various embodiments.

What is claimed is:

1. The process of producing a fatty acyl lactic acid product composed predominately of at least one fatty acid ester of lactic acid, which fatty acid has from about 14 to about 24 carbons, which process comprises:
    (a) separately reacting lactic acid in an aqueous medium at a temperature from ambient to about 80° C. with from about three-quarters of (a), to about an equal, molar equivalent of an at least partly soluble in water basicly-acting agent selected from alkali metal, ammonium, alkaline earth metal, and magnesium oxides, hydroxides, carbonates, and bicarbonates, whose cation forms with it the corresponding water-dispersible lactate, to form said corresponding lactate salt in said aqueous medium;
    (b) then heating said lactic acid salt in said aqueous medium with at least one said fatty acid in the proportion of from about 1.5 to about 1 mole of said salt per mole of fatty acid to and at a temperature within the range of about 180 to about 220° C. to drive off from about the major part to substantially all of the water and esterify and fatty acid with said lactic acid salt and form the corresponding salt of said fatty acid ester of lactic acid;
    (c) thereafter treating said salt of said ester with an aqueous solution of a mineral acid member of the class consisting of sulfuric, hydrochloric and phosphoric acids, and heating their dispersion at a temperature of from about 60° to about 95° C. for a time sufficient substantially completely to convert said salt of said ester to the corresponding acyl lactic acid, the amount of said mineral acid and its concentration in said dispersion being at least sufficient to convert said salt to said acyl lactic acid and below that which could produce any destructive products thereof under the reaction conditions; and
    (d) separating said fatty acyl lactic acid from said aqueous dispersion.

2. The process as claimed in claim 1, wherein said basicly-acting agent is a hydroxide.

3. The process as claimed in claim 2, wherein the hydroxide is sodium hydroxide.

4. The process as claimed in claim 1, wherein said fatty acid reactant has from 16 through 22 carbons.

5. The process as claimed in claim 4, wherein the fatty acid reactant is oleic acid.

6. The process as claimed in claim 4, wherein the fatty acid reactant is composed of from about 45 to about 100 percent stearic acid and any remainder is substantially entirely palmitric acid.

7. The process as claimed in claim 6, wherein said basicly-acting agent is a hydroxide.

8. The process as claimed in claim 7, wherein the hydroxide is sodium hydroxide.

9. The process as claimed in claim 1, wherein the acid used to convert the salt of the fatty acid ester of lactic acid to the corresponding free acyl lactic acid is sulfuric acid and it is used in a concentration of from about 10 to 30 percent.

10. The process as claimed in claim 9, wherein said basically-acting agent is a hydroxide, and the fatty acid reactant is composed of from about 45 to about 100 percent stearic acid and any remainder is substantially entirely palmitic acid.

11. The method as claimed in claim 1, wherein said fatty acid reactant is in approximately equimolar proportion to said lactic acid salt.

12. The method as claimed in claim 11, wherein said basicly-acting agent is sodium hydroxide.

References Cited

UNITED STATES PATENTS

| | | | |
|---|---|---|---|
| 2,733,152 | 1/1956 | Thompson et al. | 260—410.9 |
| 3,224,882 | 12/1965 | Palatine et al. | 260—410.9 |
| 3,274,221 | 9/1966 | Radlove | 260—410.9 |
| 3,275,503 | 9/1966 | Marnette et al. | 260—410.9 |

LEWIS GOTTS, Primary Examiner

D. G. RIVERS, Assistant Examiner

U.S. Cl. X.R.

99—91, 92

UNITED STATES PATENT OFFICE
CERTIFICATE OF CORRECTION

Patent No. 3,636,017　　　　　Dated January 18, 1972

Inventor(s) Stanley Eng

It is certified that error appears in the above-identified patent and that said Letters Patent are hereby corrected as shown below:

Column 1, line 50, before "discussed" should read -- below --. Column 3, line 6, "latcic" should read -- lactic -- line 74, "homogenerous" should read -- homogeneous --. Column 4, line 46, after "mixture" insert a comma (,); line 47, after "acids" insert a comma (,). Column 5, line 9, after "from 14" "to" should read -- or --; line 52, "oyl)lactate" should read -- oyl) lactate --. Column 6, end of line 5, insert a period (.). Column 8, line 2, delete the comma; line 30, "basically-" should read -- basicly- --. Claim 1, line 21, after "esterify" "and" should read -- said --. Claim 6, line 4, "palmitric" should read -- palmitic --. In the last line of the References Cited, column 10, line 49, the surname "Marnette" should read -- Marnett --.

Signed and sealed this 21st day of November 1972.

(SEAL)
Attest:

EDWARD M. FLETCHER, JR.　　　　　ROBERT GOTTSCHALK
Attesting Officer　　　　　　　　Commissioner of Patents